United States Patent
Öijer

(10) Patent No.: US 8,504,709 B2
(45) Date of Patent: Aug. 6, 2013

(54) ADAPTIVE STREAMING BUFFERING

(75) Inventor: Sten Fredrik Öijer, Lomma (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1987 days.

(21) Appl. No.: 11/381,371

(22) Filed: May 3, 2006

(65) Prior Publication Data
US 2007/0260743 A1    Nov. 8, 2007

(51) Int. Cl.
*G06F 15/16*  (2006.01)

(52) U.S. Cl.
USPC .......................................... 709/231

(58) Field of Classification Search
USPC .......................................... 709/231
See application file for complete search history.

(56) References Cited

U.S. PATENT DOCUMENTS

| | | | | |
|---|---|---|---|---|
| 6,088,412 | A * | 7/2000 | Ott | 375/372 |
| 6,366,959 | B1 * | 4/2002 | Sidhu et al. | 709/231 |
| 6,643,617 | B1 * | 11/2003 | Wood et al. | 704/226 |
| 6,970,935 | B1 | 11/2005 | Maes | |

FOREIGN PATENT DOCUMENTS

EP    1 278 353 A2    1/2003

OTHER PUBLICATIONS

International Preliminary Report on Patentability issued for international application No. PCT/IB2006/054068, mailed Oct. 2, 2008, 7 pages.
Written Opinion/International Search Report for International Application No. PCT/IB2006/054068, mailed Sep. 6, 2007.

* cited by examiner

*Primary Examiner* — Andrew Georgangdellis
(74) *Attorney, Agent, or Firm* — Snyder, Clark, Lesch & Chung, LLP

(57) ABSTRACT

A system receives streaming media data and stores the received data in a buffer to fill the buffer. The system selectively extracts the received data from the buffer to begin playback of the streaming media data. The system further analyzes remaining media data in the buffer, to identify a location in the buffer that stores an inactive period in the media data, when the buffer is emptied to a certain percentage of its capacity. The system also halts playback and re-fills the buffer with received streaming media data when the buffer reaches the location in the buffer and selectively extracts the received data from the buffer to resume playback of the streaming media data.

11 Claims, 7 Drawing Sheets

ADAPTIVE STREAMING BUFFERING

TECHNICAL FIELD OF THE INVENTION

Implementations described herein relate generally to streaming media and, more particularly, to adaptive buffering of streaming media.

BACKGROUND

Streaming media typically includes audio and video transmitted over, for example, the Internet, in a streaming or continuous fashion. In streaming media applications, streaming audio and/or video data may be played back without the data being completely downloaded first. Streaming media may, thus, be viewed or listened to in "real-time" as the data is received. Streaming media may be user-controlled (e.g., on-demand, pay-per-view movies, etc.) or server-controlled (e.g., webcasting).

There are several Internet-based streaming services including, for example, audio books, news and podcasts. Podcasting may include the distribution of real-time streaming audio and/or video data over the Internet for user viewing and/or listening. Podcasting typically involves a subscription feed of automatically delivered new audio and/or video content. Audio streaming (voice or music) may include the distribution of voice or music containing media over the Internet for user listening.

Internet-based streaming services are in the process of being introduced into the mobile world. Many mobile devices, however, operate with a low bandwidth connection. Delivery of streaming media, such as, for example, audio streaming, over a low bandwidth connection, can lead to a poor user experience if the continuous stream is constantly interrupted because buffering is needed due to depletion of data in the buffer.

SUMMARY

According to one aspect, a method may include receiving streaming media data and storing the received data in a buffer to fill the buffer. The method may further include selectively extracting portions of the received data from the buffer to begin playback of the streaming media data and analyzing remaining media data in the buffer, to identify a location in the buffer that stores an inactive period in the media data, when the buffer is emptied to a certain percentage of its capacity. The method may also include halting playback and partially or fully re-filling the buffer with received streaming media data when the buffer reaches the location in the buffer and selectively extracting the received data from the buffer to resume playback of the streaming media data.

Additionally, the inactive period may comprise a silent period in an audio portion of the streaming media data.

Additionally, the silent period may comprise a pause in speech contained in the audio portion.

Additionally, the inactive period may comprise a still period in a video portion of the streaming media data.

Additionally, the certain percentage of the buffer's capacity may comprise 20%.

According to another aspect, a method may include filling a buffer with streaming media data and locating an inactive period in the streaming media data stored in the buffer. The method may further include sequentially removing the data from the buffer and partially or fully re-filling the buffer with streaming media data when the buffer has been emptied to the located inactive period.

Additionally, the inactive period may comprise a silent period in audio contained in the streaming media data.

Additionally, the silent period may comprise a pause in speech in the audio.

Additionally, the inactive period may comprise a still period in video contained in the streaming media data.

Additionally, locating an inactive period in the streaming media data may comprise locating the inactive period when the buffer has been emptied of media data to a specified percentage of its capacity.

Additionally, the method may further include playing back the media after the buffer is filled and halting playback of the media when the buffer has been emptied of media data to the specified percentage of its capacity.

Additionally, the method may further include resuming playback of the media data after the buffer is re-filled.

According to a further aspect, a method may include filling a buffer with streaming media data. The method may further include selectively re-filling the buffer, partially or fully, when media playback reaches a period of silence in an audio portion of the media data stored in the buffer.

Additionally, the method may include retrieving the media data from the buffer and playing back the retrieved media data.

Additionally, the method may include analyzing the media data stored in the buffer to locate the period of silence in the media data when the buffer is emptied to a certain percentage of its capacity.

Additionally, the method may include re-filling the buffer with streaming media data based on the analysis of the media data.

Additionally, the method may include halting playback of the retrieved media data when the buffer has been emptied to the certain percentage of its capacity.

Additionally, the method may include resuming playback after the buffer has been re-filled.

According to an additional aspect, a system may include means for filling a buffer with streaming media data and means for locating an inactive period in the streaming media data stored in the buffer. The system may further include means for sequentially removing the data from the buffer and means for re-filling the buffer, partially or fully, with streaming media data when the buffer has been emptied to the located inactive period.

According to yet another aspect, a system may include a buffer and a communication interface configured to receive streaming media data. The system may further include a buffer controller configured to store the received data in the buffer to fill the buffer and selectively extract the received data from the buffer to begin playback of the streaming media data. The system may also include a buffer analyzer configured to analyze remaining media data in the buffer, to identify a location in the buffer that stores an inactive period in the media data, when the buffer is emptied to a certain percentage of its capacity. The buffer controller may further be configured to halt playback and partially or fully re-fill the buffer with received streaming media data when the buffer reaches the location in the buffer, and selectively extract the received data from the buffer to resume playback of the streaming media data.

According to a further aspect, a method may include filling a buffer with streaming media data and identifying a flag included within the buffered streaming media data. The method may further include selectively partially or fully re-filling the buffer with streaming media data based on the identification of the flag within the buffered streaming media data.

According to an additional aspect, a method may include receiving streaming media data and storing the received data in a buffer to fill the buffer. The method may further include selectively extracting portions of the received data from the buffer to begin playback of the streaming media data and identifying a flag inserted within the remaining media data in the buffer. The method may also include halting playback and partially or fully re-filling the buffer with received streaming media data when the buffer reaches the flag inserted within the remaining media data in the buffer and selectively extracting the received data from the buffer to resume playback of the streaming media data.

It should be emphasized that the term "comprises/comprising" when used in this specification is taken to specify the presence of stated features, integers, steps, components or groups but does not preclude the presence or addition of one or more other features, integers, steps, components or groups thereof.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

Consistent with aspects of the invention, an adaptive buffering technique is provided that halts media playback and re-fills a buffer with streaming media data when it is appropriate from a media context point of view. For example, playback may be halted when there is a natural pause is speech contained in the media data regardless of how full or empty the buffer is. Consistent with aspects of the invention, the natural pause may be extended with an amount of time required to buffer additional streaming media data. Existing buffering techniques wait until the buffer is emptied of streaming data before re-filling the buffer. This re-filling of the buffer happens without any relation to the actual media that is being played, which means that the re-filling may occur, for example, in the middle of a sentence or even in the middle of a word. In contrast, consistent with aspects of the invention, re-filling the buffer at, for example, natural pauses in the media is likely to be less intrusive than completely re-filling the buffer when the buffer is emptied.

Figure 1:
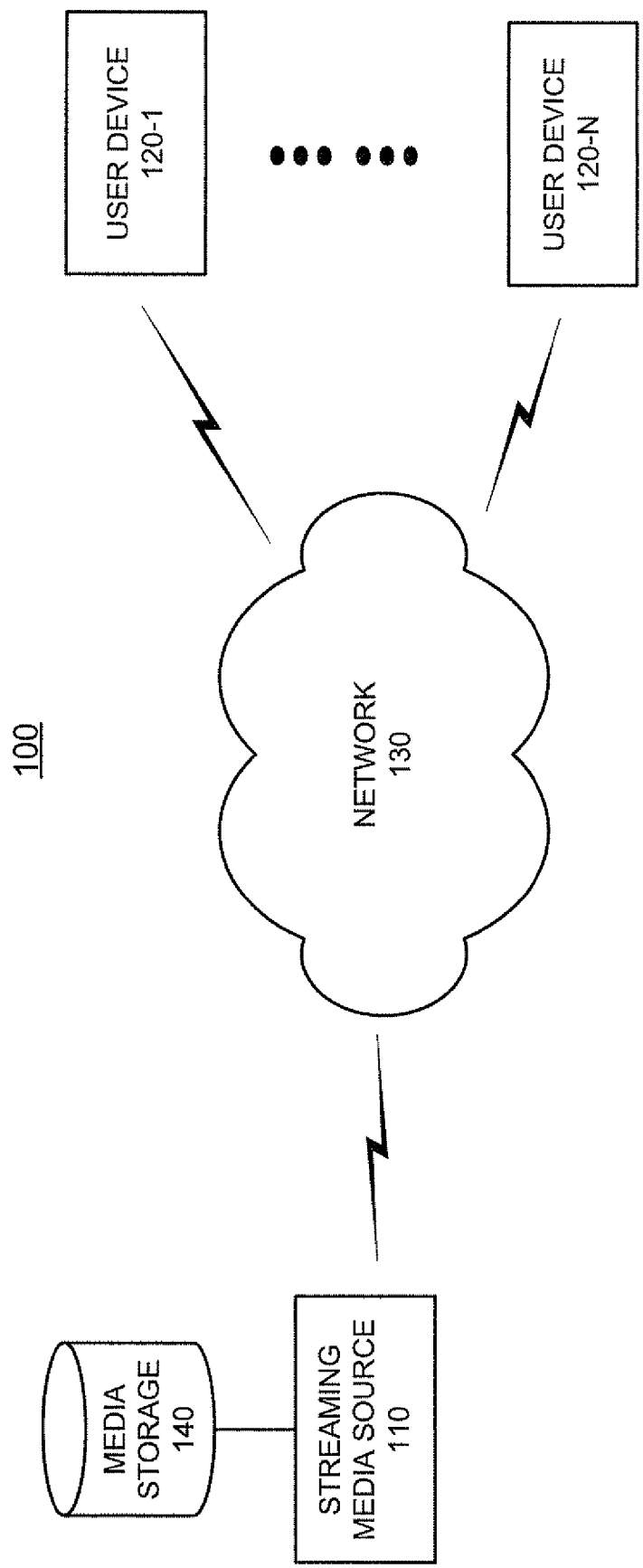
FIG. 1 illustrates an exemplary system in which aspects of the invention may be implemented.

FIG. 1 illustrates an exemplary system 100 in which aspects of the invention may be implemented. System 100 may include a streaming media source 110 and one or more user devices 120-1 through 120-N (individually referred to herein as "user device 120") connected to streaming media source 110 via a network 130 using wireless, wired, or optical connection links. Network 130 may include one or more sub-networks of any type, including a local area network (LAN), a wide area network (WAN), a satellite network, a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

User device 120 may include a personal computer, a telephone, a cellular radiotelephone, a Personal Communications System (PCS) terminal or the like. A PCS terminal may combine a cellular radiotelephone with data processing, facsimile and/or data communications capabilities. User device 120 may further include a personal digital assistant (PDA), a conventional laptop and/or palmtop receiver, or another appliance that includes a radiotelephone transceiver, or the like. A PDA may include a radiotelephone, a pager, Internet/intranet access, a web browser, an organizer, calendars and/or a global positioning system (GPS) receiver. User device 120 may further be referred to as a "pervasive computing" device.

Streaming media source 110 may include a server entity that may transmit streaming media to user devices 120-1 through 120-N via network 130. Streaming media source 110 may connect to media storage 140. Media storage 140 may store media content that may be retrieved by media source 110 and transmitted to user devices 120-1 through 120-N as streaming media.

Figure 2:
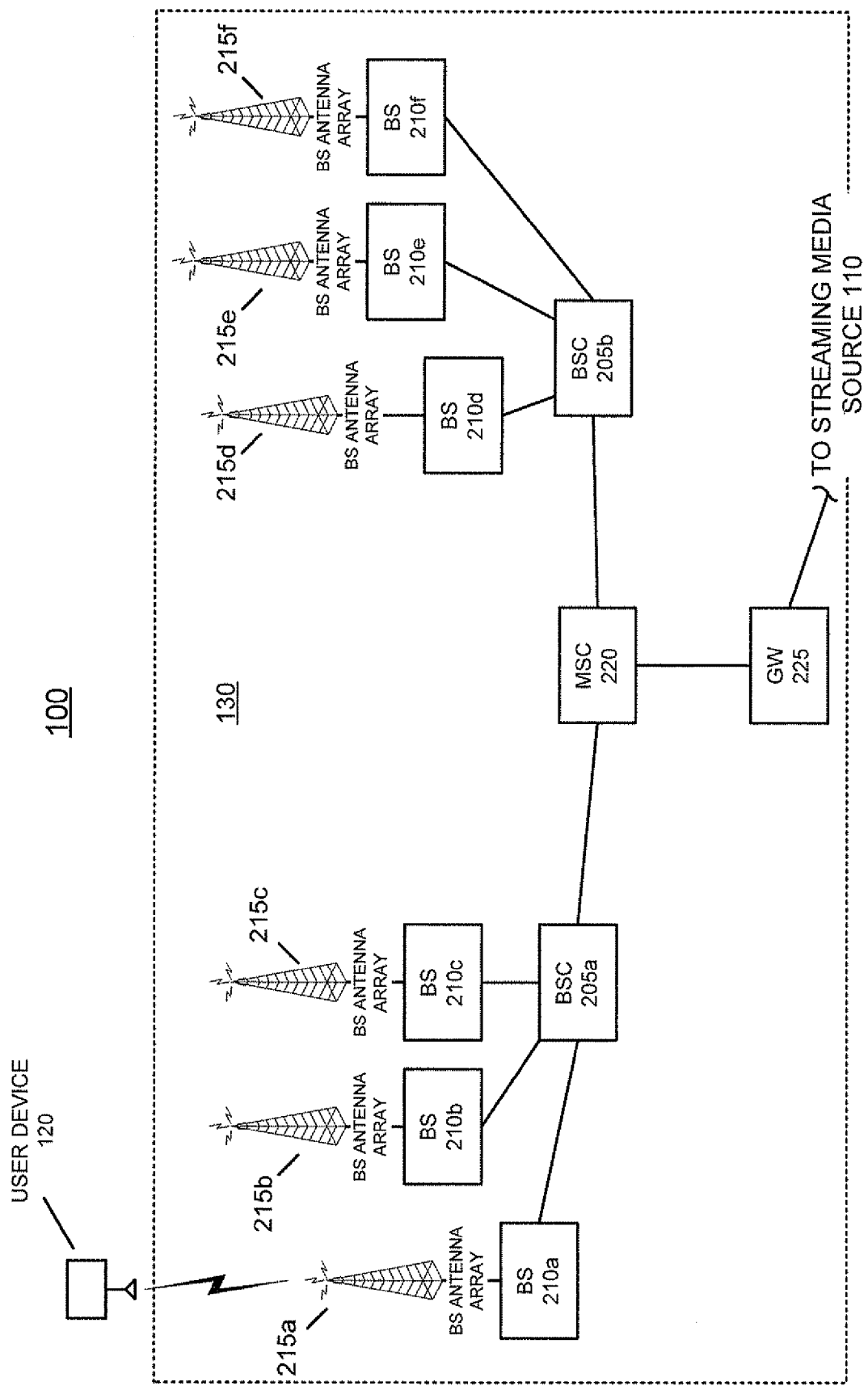
FIG. 2 illustrates an exemplary system that includes a cellular network consistent with principles of the invention.

FIG. 2 illustrates one example of system 100 implemented using a cellular network. In system 100, as illustrated in FIG. 2, user device 120 may include a mobile station and network 130 may include a PLMN (e.g., a cellular telephone network). As shown, system 100 may include user device 120 connected to cellular network 130. Cellular network 130 may include one or more base station controllers (BSCs) 205a and 205b, multiple base stations (BSs) 210a-210f, multiple base station antenna arrays 215a-215f, one or more mobile switching centers (MSCs), such as MSC 220, and one or more gateways (GWs), such as GW 225.

Cellular network 130 may consist of components conventionally used for transmitting data to and from user device 120 and streaming media source 110 (not shown). Such components may include base station antenna arrays 215a-215f, which transmit and receive, via appropriate data channels, data from mobile stations within their vicinity. Base stations 210a-210f connect to their respective antenna arrays 215a-215f, and format the data transmitted to, or received from the antenna arrays 215a-215f in accordance with conventional techniques, for communicating with BSCs 205a-205b or a mobile station, such as user device 120. Among other functions, BSCs 205a-205b may route received data to either MSC 220 or a base station (e.g., BSs 210a-210c or 210d-210t. MSC 220 routes received data to BSC 205a or 205b. GW 225 may route data received from an external domain (not shown) to an appropriate MSC (such as MSC 220), or from an MSC to an appropriate external domain. Streaming media source 110 (not shown in FIG. 2) may connect to cellular network 130 via another network (e.g., the Internet) and GW 225.

Figure 3:
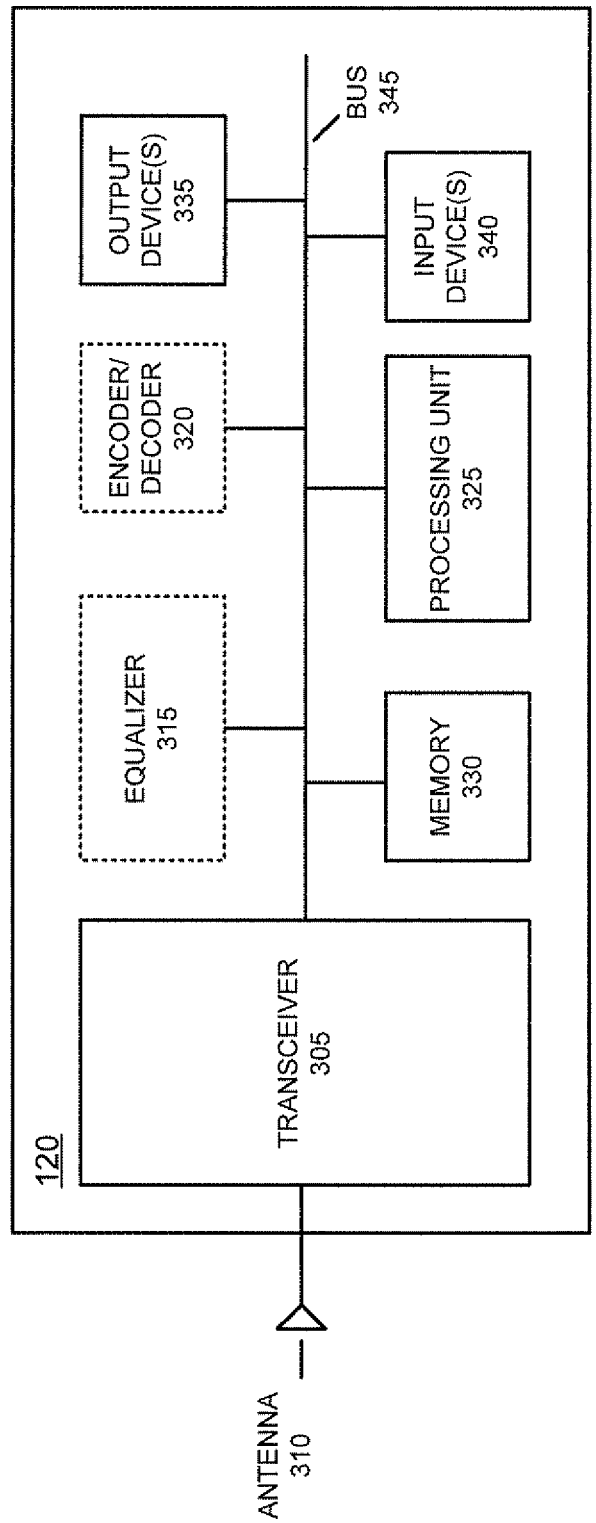
FIG. 3 illustrates an exemplary user device consistent with principles of the invention.

FIG. 3 illustrates an exemplary user device 120 consistent with principles of the invention. User device 120 may include a transceiver 305, an antenna 310, an optional equalizer 315, an optional encoder/decoder 320, a processing unit 325, a memory 330, an output device(s) 335, an input device(s) 340, and a bus 345.

Transceiver 305 may include transceiver circuitry well known to one skilled in the art for transmitting and/or receiving symbol sequences in a network, such as network 130, via antenna 310. Transceiver 305 may include, for example, a conventional RAKE receiver. Transceiver 305 may further include mechanisms for estimating the signal-to-interference ratio (SIR) of received symbol sequences. Transceiver 305 may additionally include mechanisms for estimating the propagation channel Doppler frequency.

Equalizer 315 may store and implement Viterbi trellises for estimating received symbol sequences using, for example, a maximum likelihood sequence estimation technique. Equalizer 315 may additionally include mechanisms for performing channel estimation.

Encoder/decoder 320 may include circuitry for decoding and/or encoding received or transmitted symbol sequences. Processing unit 325 may perform all data processing functions for inputting, outputting, and processing of data including data buffering and terminal control functions, such as call processing control, user interface control, or the like. Memory 330 provides permanent, semi-permanent, or temporary working storage of data and instructions for use by processing unit 325 in performing processing functions. Memory 330 may include large-capacity storage devices, such as a magnetic and/or optical recording medium and its corresponding drive. Output device(s) 335 may include mechanisms for outputting data in video, audio, and/or hard copy format. Input device(s) 340 permit entry of data into user device 120 and may include a user interface and a microphone (not shown). The microphone can include mechanisms for converting auditory input into electrical signals. Bus 345 interconnects the various components of user device 120 to permit the components to communicate with one another. The configuration of components of user device 120 illustrated in FIG. 3 is for illustrative purposes only. One skilled in the art will recognize that other configurations may be implemented.

Exemplary Adaptive Buffering Functional Diagram

Figure 4:
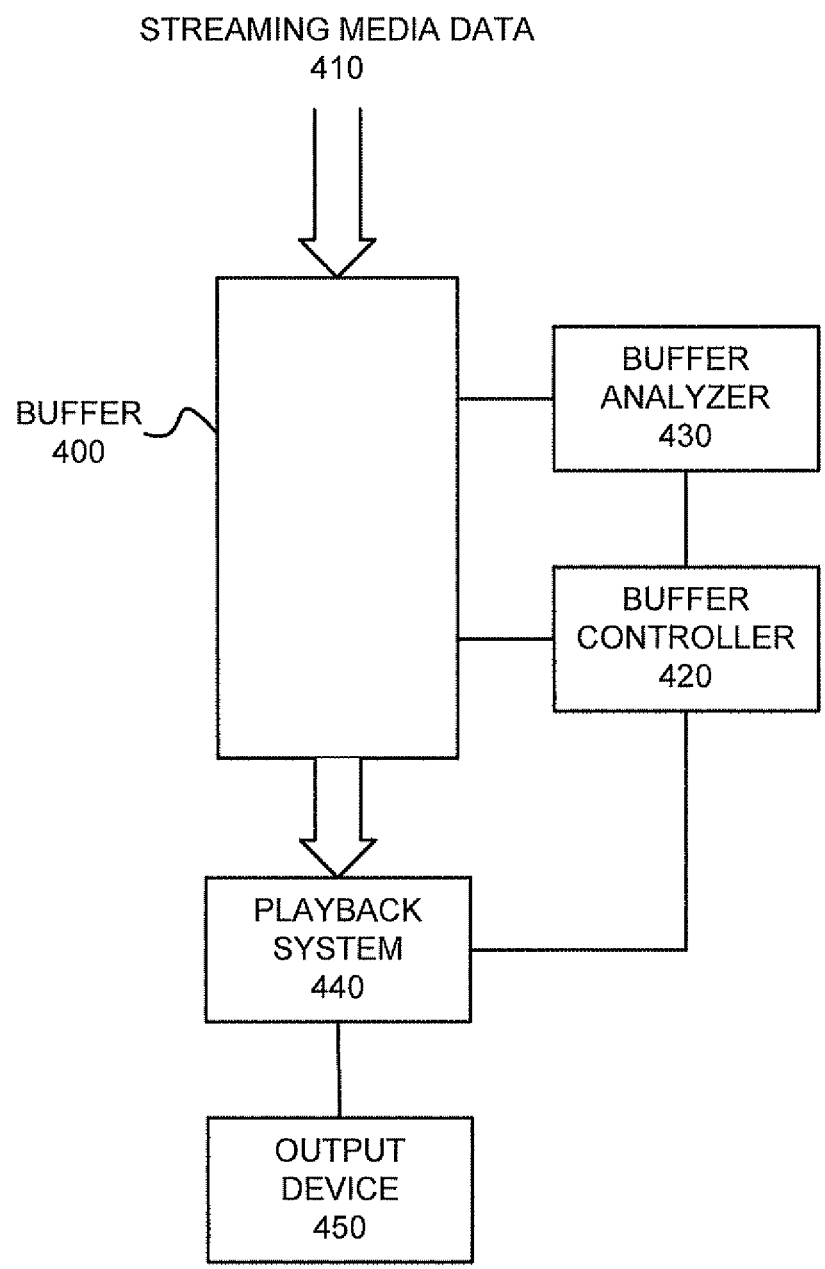
FIG. 4 illustrates an exemplary functional diagram of an adaptive buffering system consistent with principles of the invention.

FIG. 4 is an exemplary functional diagram of adaptive buffering consistent with principles of the invention. Adaptive buffering, consistent with principles of the invention, may include a buffer 400, a buffer controller 420, a buffer analyzer 430, a playback system 440 and an output device 450. In some implementations, buffer 400 may be implemented by memory 330, and buffer controller 420, buffer analyzer 430 and playback system 440 may be implemented by processing unit 325.

Buffer 400 may receive and store received streaming media data 410. Buffer controller 420 may control the sequential storage of streaming media data 410 in buffer 400, and retrieval of the data from buffer 400 for playback by playback system 440. Buffer analyzer 430 may analyze the data stored in buffer 400 to identify specific periods in the streaming media that correspond to "inactive" periods. Such inactive periods may include, for example, periods in which the audio data is silent (e.g., a natural pause in speech) or periods in which the video data is "still" (e.g., little or no change in the video frame by frame for a number of frames).

Playback system 440 may receive data retrieved from buffer 400 by buffer controller 420, and may play the streaming media data to a listener or viewer via output device 450. For example, playback system 440 may decode the data from buffer 400 before using output device 450 to convert the decoded data from an electrical signal to an auditory output signal. As another example, playback system 440 may decode the data from buffer 400 before using output device 450 to convert the video data to a visual representation on a visual display unit.

Exemplary Adaptive Streaming Buffering Process

Figure 5A:
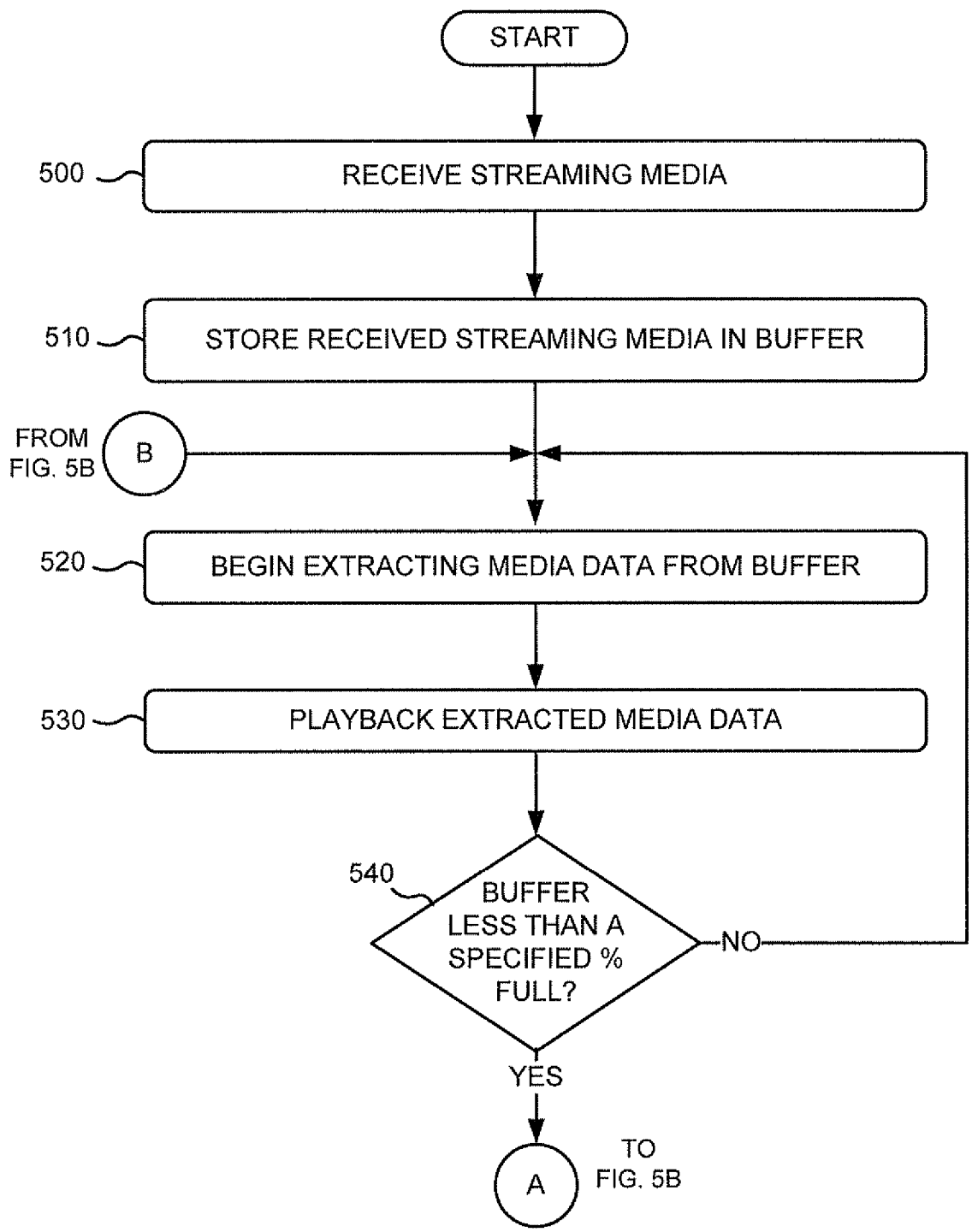
FIGS. 5A and 5B are a flowchart of an exemplary process for adaptive streaming buffering consistent with principles of the invention.
Figure 5B:
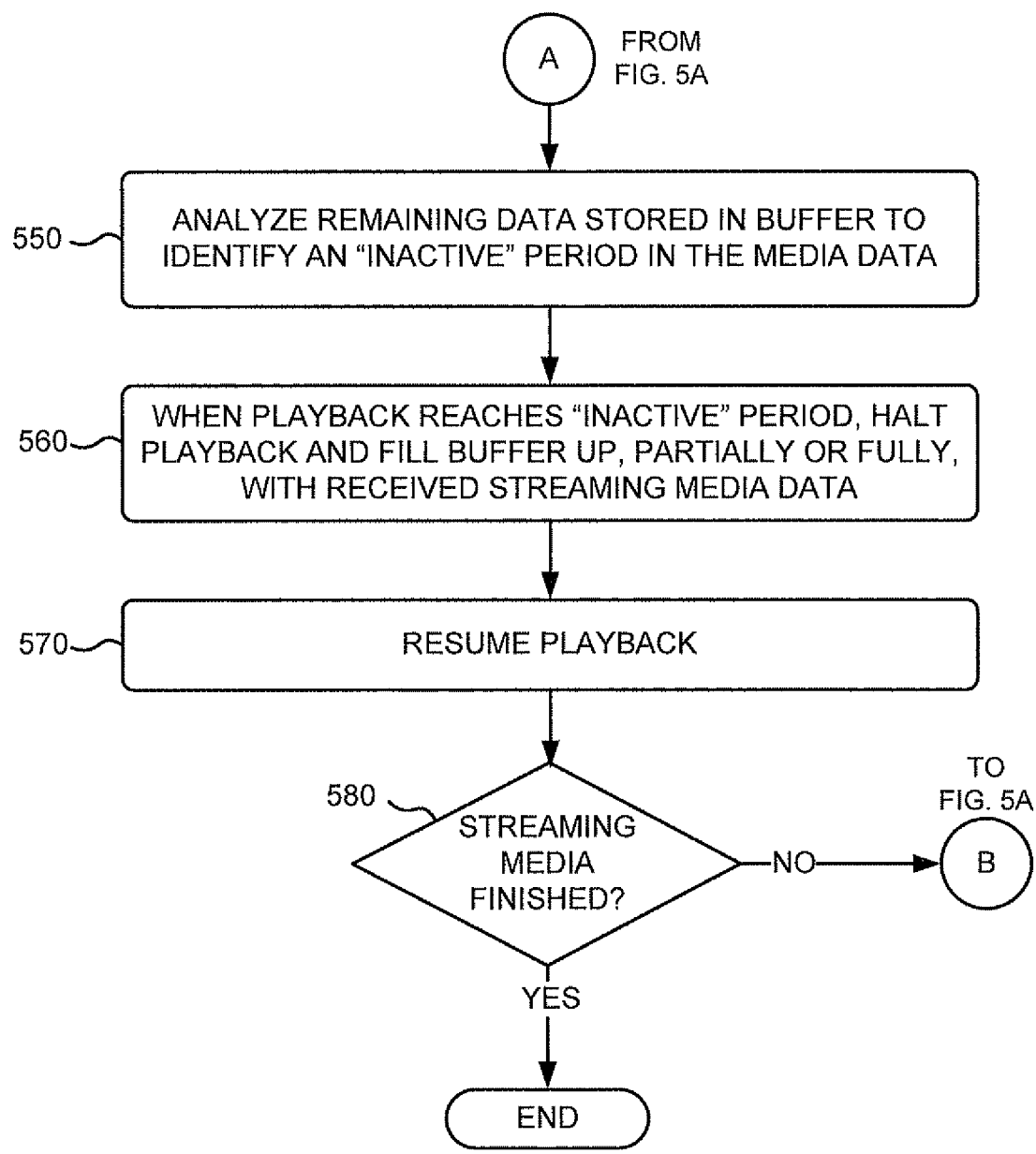

FIGS. 5A and 5B are a flowchart of an exemplary process for adaptively buffering streaming media consistent with principles of the invention. A user device 120 may implement the process exemplified by FIGS. 5A and 5B.

The exemplary process may begin with the receipt of streaming media data (block 500) (FIG. 5A). The streaming media data may be received from streaming media source 110 via network 130. The received streaming media may be stored in buffer 400 (block 510). Buffer controller 420 may control the sequential storage of the received streaming media data in buffer 400.

Buffer controller 420 may begin extracting the media data from buffer 400 (block 520). Buffer controller 420 may begin extracting the media data from buffer 400 when buffer 400 is full, or when buffer 400 has been filled to a predetermined threshold. Buffer controller 400 may determine that buffer 400 is full if the last available memory location in buffer has been used for storing streaming media data 410. Buffer controller 420 may pass the extracted media data to playback system 440. Playback system 440 may playback the extracted media data (block 530). For example, playback system 440 may perform any necessary decoding of the media data and provide the decoded media data to output device 450 as output audio and/or video.

During playback, buffer controller 420 may determine if buffer 400 is less than a specified percentage full (i.e., buffer has been emptied to a certain percentage of its capacity) (block 540). For example, in one implementation, buffer controller 420 may determine if buffer 400 has been emptied by playback such that buffer 400 is only 20% full. In other implementations, the specified percentage may be varied and/or may be user configurable. For example, buffer controller 420 may determine if buffer 400 has been emptied by playback such that buffer 400 is only 25% full. In another implementation, instead of determining how empty buffer 400 is, buffer controller 420 may determine if playback has reached a "halt-and-fill-buffer" flag contained in the streaming media data stored in buffer 400. This flag can be inserted into the streaming media data by, for example, the creator of the audio or video content. Playback of the streaming media retrieved from buffer 400 may, thus, continue until the "halt-and-fill-buffer" flag is reached in the data stored in buffer 400, at which point playback will halt, and additional streaming media data may be stored in buffer 400 to partially or fully re-fill buffer 400. In this implementation, blocks 550 and 560 may be skipped and, after buffer 400 has been partially or fully filled, playback may be resumed at block 570 below.

Figure 6A:
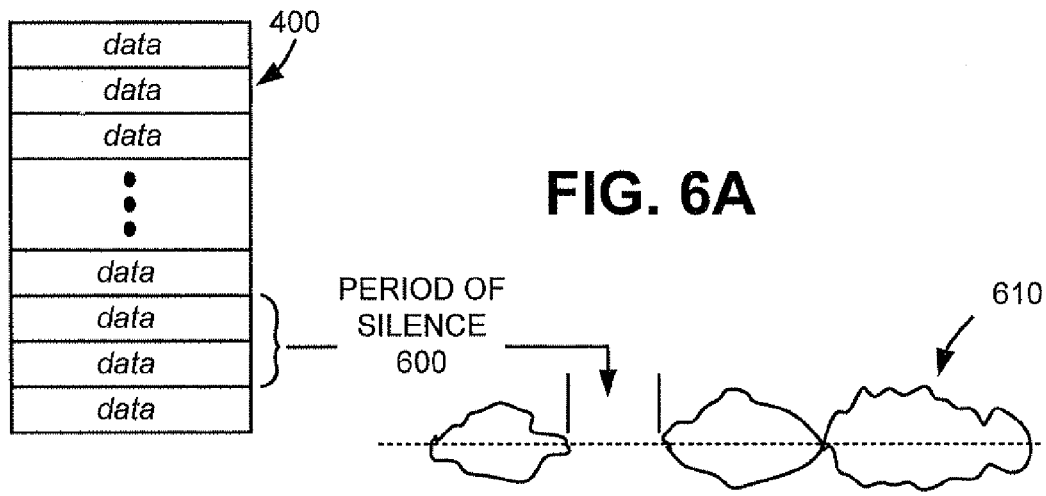
FIGS. 6A, 6B and 6C depict illustrative examples of the adaptive buffering of FIGS. 5A and 5B consistent with principles of the invention.

Buffer analyzer 430 may analyze remaining media data stored in buffer 400 to identify an "inactive" period in the media data (block 550) (FIG. 5B). The "inactive" period may include a period of silence in audio of the media data (e.g., a natural pause in speech contained in the media data). Alternatively, or additionally, the "inactive" period may include a "still" period in video (e.g., a period with relatively little change frame by frame in the video) of the media data. Identification of the "inactive" period in the media data may include identifying a location in buffer 400 at which the "inactive" period of media data is stored. FIG. 6A depicts an illustrative example of the identification of a period of silence 600 in audio 610 associated with data stored in buffer 400.

Figure 6B:
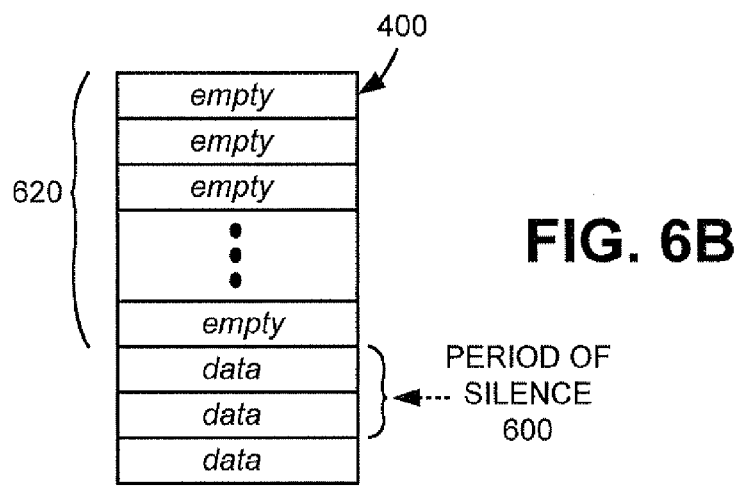
Figure 6C:
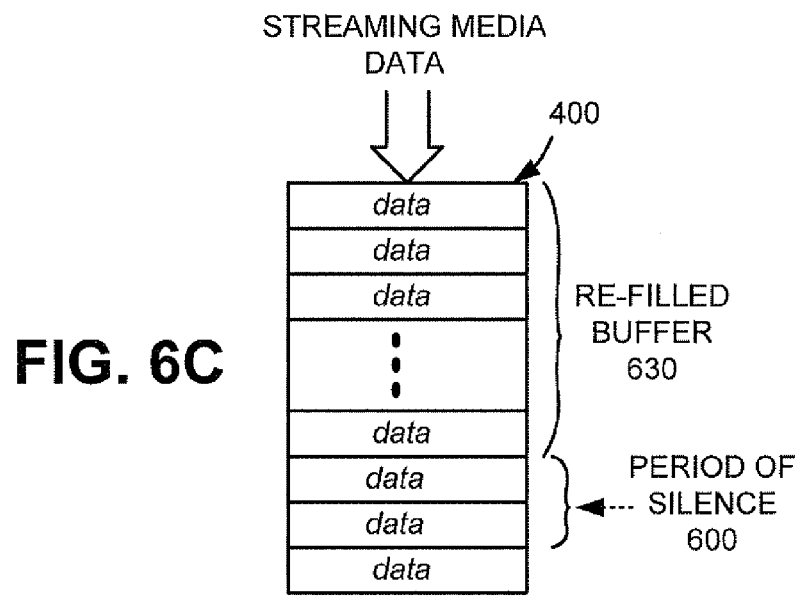

When playback reaches the "inactive" period of media data in buffer 400, buffer controller 420 may halt playback and may fill buffer 400 up, partially or fully, with received streaming media data (block 560). Buffer controller 420 may fill buffer 400 up to 100% capacity, or to a predetermined threshold less than 100% capacity. FIG. 6B depicts an illustrative example in which media data 620 has been emptied from buffer 400 to reach the identified period of silence 600. As further depicted in the illustrative example of FIG. 6C, received streaming data may be used to re-fill buffer 630 once media data has been emptied from buffer 400 to reach the identified period of silence 600. Playback system 440 may then resume playback (block 570). Halting of playback, thus, occurs during a natural pause in the audio or video of the streaming media.

Buffer controller 420 may determine if the streaming media is finished (block 580). If not, then the exemplary process may return to block 520 above with the extraction of the next sequential media data from buffer 400. If the streaming media is finished, then the exemplary adaptive buffering process may end.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while a series of acts has been described with regard to FIGS. 5A and 5B, the order of the acts may be modified in other implementations consistent with the principles of the invention. Further, non-dependent acts may be performed in parallel. While aspects of the invention have described the adaptive buffering as re-filling buffer 400 to 100% of its capacity during an "inactive" period in the streaming media data stored in the buffer, in other implementations, buffer controller 420 may identify multiple "inactive" periods, and may stop playback for a shorter period of time (i.e., less time than it takes to completely fill buffer 400 up to 100%) at each "inactive" period to partially re-fill buffer 400 without completely halting to fill buffer 400 back to 100%.

One skilled in the art will recognize that the principles of the present invention may be applied to any wired or wireless system utilizing any type of multi-access scheme, such as TDMA, CDMA or FDMA. It should be further understood that the principles of the present invention may be utilized in hybrid systems that are combinations of two or more of the above multi-access schemes. In addition, a communication device, in accordance with the present invention, may be designed to communicate with, for example, a base station transceiver using any standard based on GSM, TDMA, CDMA, FDMA, a hybrid of such standards or any other standard.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving streaming media data;
   storing the received data in a buffer to fill the buffer;
   selectively extracting portions of the received data from the buffer to begin playback of the streaming media data;
   analyzing remaining media data in the buffer, to identify a location in the buffer that stores an inactive period in the media data, when the buffer is emptied to a certain percentage of its capacity, where the inactive period comprises a still period in a video portion of the streaming media data and where the still period in the video portion of the streaming media data comprises a period having relatively little change frame by frame in the video portion;
   halting playback and partially or fully re-filling the buffer with received streaming media data when the buffer reaches the location in the buffer; and
   selectively extracting the received data from the buffer to resume playback of the streaming media data.

2. The method of claim 1, wherein the inactive period further comprises a silent period in an audio portion of the streaming media data.

3. The method of claim 2, wherein the silent period comprises a pause in speech contained in the audio portion.

4. The method of claim 1, wherein the certain percentage of the buffer's capacity comprises 20%.

5. A method, comprising:
   filling a buffer with streaming media data;
   locating an inactive period in the streaming media data stored in the buffer, where the inactive period comprises a still period in video contained in the streaming media data and where the still period in the video comprises a period having relatively little change frame by frame in the video;
   sequentially removing the data from the buffer; and
   partially or fully re-filling the buffer with streaming media data when the buffer has been emptied to the located inactive period.

6. The method of claim 5, wherein the inactive period further comprises a silent period in audio contained in the streaming media data.

7. The method of claim 6, wherein the silent period comprises a pause in speech in the audio.

8. The method of claim 5, wherein locating an inactive period in the streaming media data comprises:

locating the inactive period when the buffer has been emptied of media data to a specified percentage of its capacity.

9. The method of claim 8, further comprising:
playing back the media after the buffer is filled; and
halting playback of the media when the buffer has been emptied of media data to the specified percentage of its capacity.

10. The method of claim 9, further comprising:
resuming playback of the media data after the buffer is re-filled.

11. A system, comprising:
a buffer;
a communication interface configured to receive streaming media data;
a buffer controller configured to:
store the received data in the buffer to fill the buffer, and
selectively extract the received data from the buffer to begin playback of the streaming media data; and
a buffer analyzer configured to analyze remaining media data in the buffer, to identify a location in the buffer that stores an inactive period in the media data, when the buffer is emptied to a certain percentage of its capacity, where the inactive period comprises a still period in a video portion of the streaming media data and where the still period in the video portion of the streaming media data comprises a period having relatively little change frame by frame in the video portion;
the buffer controller further configured to:
halt playback and partially or fully re-fill the buffer with received streaming media data when the buffer reaches the location in the buffer, and
selectively extract the received data from the buffer to resume playback of the streaming media data.

* * * * *